(No Model.)

C. G. MEMMINGER.
POT SCRAPER.

No. 490,577.  Patented Jan. 24, 1893.

WITNESSES
Geo. E. Frech
Rob't F. Fitzgerald

INVENTOR
C. G. Memminger
By Lehmann Pattison & Nesbit
Att'ys

UNITED STATES PATENT OFFICE.

CHRISTOPHER G. MEMMINGER, OF CHARLESTON, SOUTH CAROLINA.

POT-SCRAPER.

SPECIFICATION forming part of Letters Patent No. 490,577, dated January 24, 1893.

Application filed August 16, 1892. Serial No. 443,214. (No model.)

*To all whom it may concern:*

Be it known that I, CHRISTOPHER G. MEMMINGER, of Charleston, in the county of Charleston and State of South Carolina, have invented certain new and useful Improvements in Pot-Scrapers; and I do hereby declare the following to be a full, clear, and exact description of the invention, such as will enable others skilled in the art to which it pertains to make and use it, reference being had to the accompanying drawings, which form part of this specification.

My invention relates to an improvement in pot scrapers: and it consists in the novel features of construction which will be fully described hereinafter, and more particularly referred to in the claim.

The object of my invention is to provide an improved tool for scraping or cleaning pots and other like utensils which may be held easily and securely in the hand of an operator.

Figure 1:
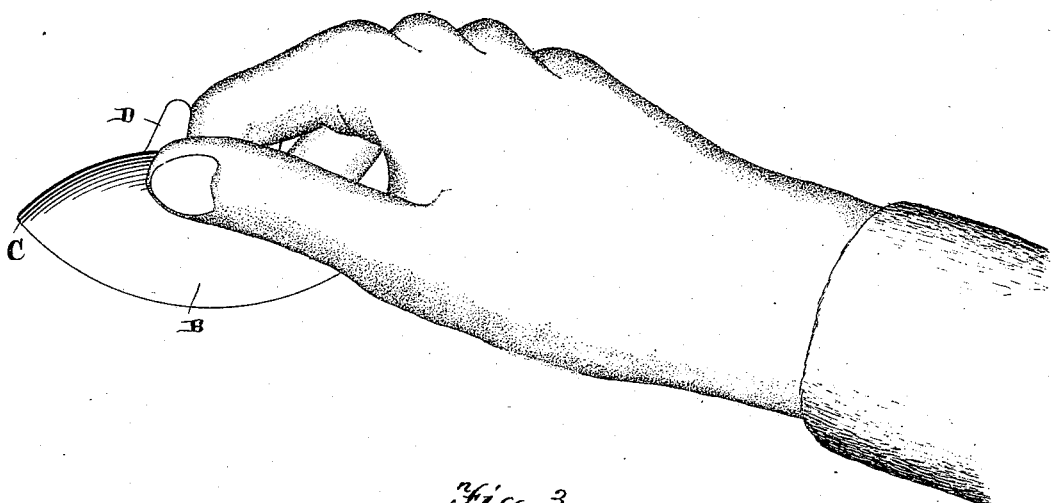
Figure 3:
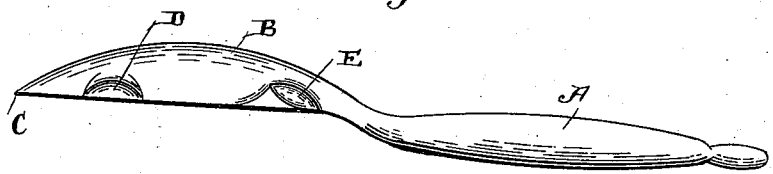
Figure 2:
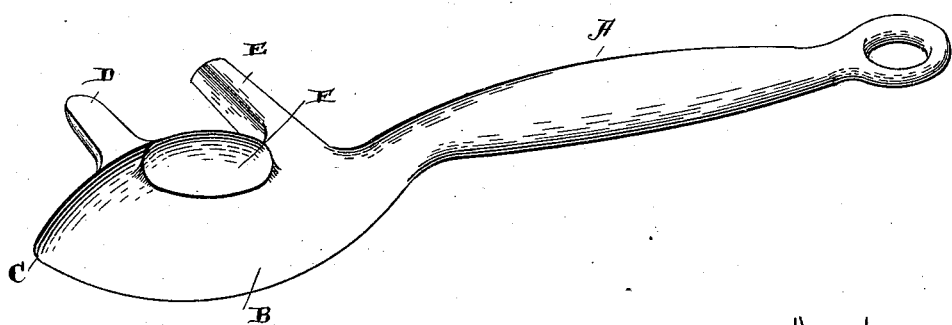

Referring to the accompanying drawings,—Figure 1 is a perspective view of my improved scraper showing it in position in the hand of an operator. Fig. 2 is a similar view of the scraper alone. Fig. 3 is an enlarged view of the scraper.

A, represents the handle of the tool, and B, the spoon shaped scraping portion which terminates at the point C.

The upper portion of the scraper is thickened as shown and projecting from this thickened portion are the prongs or projections D and E. The adjacent edges of these projections are beveled as shown in Fig. 3 so that the forefinger of the hand of the operator may be extended with ease between the said prongs as shown in Fig. 1 thus giving the operator a very secure hold on the scraper. This feature of the implement is very useful when it is desired to remove very tenacious matter from the utensil as without it the scraper is liable to turn in the hand.

Formed in the concave or inner side of the scraper is the bulge F, located below and between the prongs D, and E, thus forming a rest for the thumb while grasping the tool.

The scraper of the implement being spoon shaped a receptacle is formed for the reception of scrapings in which they may be removed with ease.

The point C, enables the operator to reach all points and crevices.

Having thus particularly described my invention what I claim as new and desire to secure by Letters Patent is,—

As an article of manufacture, the herein described pot scraper, formed spoon shaped with the pointed bowl, and the handle, projections D, E, extending from one edge of the bowl, and the bulge F in the inside of the bowl below said projections, as set forth.

In testimony whereof I affix my signature in presence of two witnesses.

CHRISTOPHER G. MEMMINGER.

Witnesses:
H. W. MELCHER,
W. R. GREER.